(12) United States Patent
Potyrailo et al.

(10) Patent No.: US 8,508,368 B2
(45) Date of Patent: Aug. 13, 2013

(54) DISPOSABLE SENSING DEVICE HAVING RADIO FREQUENCY BASED SENSOR

(75) Inventors: Radislav Alexandrovich Potyrailo, Niskayuna, NY (US); William Guy Morris, Rexford, NY (US); David James Monk, Rexford, NY (US); Vijay Singh, Bernardsville, NJ (US)

(73) Assignee: General Electric Company, Niskayuna, NY (US)

( * ) Notice: Subject to any disclaimer, the term of this patent is extended or adjusted under 35 U.S.C. 154(b) by 821 days.

(21) Appl. No.: 12/124,413

(22) Filed: May 21, 2008

(65) Prior Publication Data

US 2009/0289792 A1    Nov. 26, 2009

(51) Int. Cl.
*G08B 13/14* (2006.01)
*G08B 23/00* (2006.01)
*H04Q 5/22* (2006.01)
*G06Q 30/00* (2006.01)
*G06F 17/00* (2006.01)
*G06K 19/06* (2006.01)
*G06K 5/00* (2006.01)
*G06K 15/00* (2006.01)
*A61B 1/32* (2006.01)
*G05B 19/00* (2006.01)

(52) U.S. Cl.
USPC ............ 340/572.1; 340/10.41; 340/10.51; 340/572.8; 340/573.1; 340/5.8; 235/375; 235/385; 235/492; 235/380; 235/462.13; 600/202

(58) Field of Classification Search
USPC .............. 340/539.26, 572.1, 572.7, 572.8, 340/541, 633, 540, 10.1, 573.1, 10.3, 435, 340/10.51, 10.41; 700/105, 110, 230, 231, 700/239, 244, 265–273, 281–283, 285; 137/177, 251.1, 798; 235/385, 375, 492, 235/380, 462.13; 73/116
See application file for complete search history.

(56) References Cited

U.S. PATENT DOCUMENTS

| | | | |
|---|---|---|---|
| 5,892,458 A | 4/1999 | Anderer et al. | |
| 6,217,744 B1 * | 4/2001 | Crosby | 205/775 |
| 6,371,380 B1 * | 4/2002 | Tanimura | 235/492 |
| 7,135,977 B2 | 11/2006 | Burg et al. | |
| 7,195,149 B2 | 3/2007 | Baker et al. | |
| 7,205,899 B2 * | 4/2007 | Surkau | 340/572.8 |
| 7,218,232 B2 * | 5/2007 | DiSilvestro et al. | 340/572.8 |
| 7,299,981 B2 * | 11/2007 | Hickle et al. | 235/385 |

(Continued)

FOREIGN PATENT DOCUMENTS

| | | |
|---|---|---|
| EP | 1557787 A | 7/2005 |
| GB | 2308947 A | 7/1999 |

(Continued)

OTHER PUBLICATIONS

PCT/EP2009/056108, Search Report, Sep. 3, 2009.

(Continued)

*Primary Examiner* — Jennifer Mehmood
*Assistant Examiner* — Mirza Alam
(74) *Attorney, Agent, or Firm* — Marie-Claire B. Maple

(57) ABSTRACT

A sensing device for sensing one or more conditions inside a container is provided. The sensing device comprises a radio frequency based sensor; a support for positioning the sensor in operative proximity to the inside of the container, and a pick-up coil in operative association with the sensor.

24 Claims, 8 Drawing Sheets

(56) References Cited

U.S. PATENT DOCUMENTS

| | | |
|---|---|---|
| 2005/0009122 A1 | 1/2005 | Whelan et al. |
| 2005/0116022 A1* | 6/2005 | Mallett et al. ............... 235/375 |
| 2005/0119915 A1 | 6/2005 | Mallett et al. |
| 2005/0247782 A1* | 11/2005 | Ambartsoumian .......... 235/385 |
| 2005/0276728 A1 | 12/2005 | Muller-Cohn |
| 2006/0059978 A1* | 3/2006 | Jacob et al. ................... 73/116 |
| 2006/0290496 A1* | 12/2006 | Peeters ...................... 340/572.1 |
| 2007/0008112 A1 | 1/2007 | Covannon et al. |
| 2007/0024425 A1 | 2/2007 | Nitzan et al. |
| 2007/0085686 A1 | 4/2007 | Oz |
| 2007/0088245 A1 | 4/2007 | Babaev et al. |
| 2007/0090926 A1 | 4/2007 | Potyrailo et al. |
| 2007/0090927 A1 | 4/2007 | Potyrailo et al. |
| 2007/0186923 A1 | 8/2007 | Poutiatine et al. |
| 2007/0292897 A1 | 12/2007 | Yazawa et al. |
| 2008/0042837 A1* | 2/2008 | Burke ....................... 340/572.1 |

FOREIGN PATENT DOCUMENTS

| | | |
|---|---|---|
| WO | 2005111961 A1 | 11/2005 |
| WO | 2006/048789 A1 | 5/2006 |
| WO | WO2006048789 | 5/2006 |
| WO | 2007139574 A | 12/2007 |

OTHER PUBLICATIONS

PCT/EP2009/056108, Written Opinion, Sep. 3, 2009.

* cited by examiner

DISPOSABLE SENSING DEVICE HAVING RADIO FREQUENCY BASED SENSOR

BACKGROUND

The invention relates to sensing devices, and more particularly to disposable sensing devices for use in bioprocess components.

Radio frequency identification (RFID) tags are widely employed for automatic identification of objects (e.g. animals, garments, etc.) and detection of unauthorized opening of containers. The attractiveness of conventional passive RFID tags comes from their low cost. For sensing applications, RFID sensors often require a battery. The use of battery in the RFID sensors leads to increases in size of the sensors and demands more power for the operation of the sensors. Hence, the RFID sensors lose their attractiveness as passive sensors.

Typically pharmaceutical manufacturing plants require cleaning of the entire plant after manufacturing of each batch of pharmaceuticals. Due to the huge size of such plants, these plants require large amount of water for cleaning. In addition, due to the high risk of contamination involved, these plants are sterilized using steam. This requires another plant to produce steam for steam sterilization. Therefore, for small batch sizes it is not very economical to use large size plants that require extensive cleaning. Accordingly, small bioprocess plants are desirable. Further, in order to avoid cleaning of these plans, it is desirable to have small-scale disposable plants. Disposable sensors are necessary to operate and control such disposable plants.

Therefore, it would be desirable to provide sensor assembly to go with such disposable systems.

BRIEF DESCRIPTION

In one embodiment, a sensing device for sensing one or more conditions inside a container is provided. The sensing device comprises a radio frequency based sensor; a support for positioning the sensor in operative proximity to the inside of the container, and a pick-up coil in operative association with the sensor.

In another embodiment, a sensing device for sensing one or more conditions inside a disposable container is provided. The sensing device comprises a radio frequency based sensor, wherein the sensor is pre-calibrated; a pick-up coil in operative association with the sensor, and a support for positioning the sensor and the pick-up coil in operative proximity to one another.

In yet another embodiment, a sensing device for sensing one or more conditions inside a container is provided. The sensing device comprises a radio frequency based sensor; a support for positioning the sensor in operative proximity to the inside of the container, a pick-up coil in operative association with the sensor, and a fixing element, fixed to the container, to which the pick-up coil is, directly or indirectly fixed.

In another embodiment, a system having a sensing device for sensing one or more conditions inside a container is provided. The sensing device comprises a radio frequency based sensor, a support for positioning the sensor in operative proximity to the inside of the container, and a pick-up coil in operative association with the sensor.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
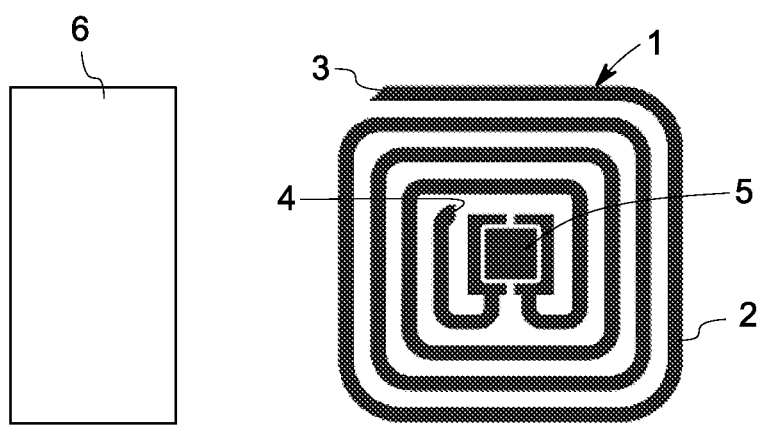
FIG. 1 is a schematic representation of a sensor having a memory chip and an antenna.

Described herein is a sensing device for sensing one or more conditions inside a container. In certain embodiments, at least a portion of the sensing device may be disposable in nature. In certain embodiments, the sensing device includes a radio frequency based sensor, a support for positioning the sensor in operative proximity to the inside of the container, and a pick-up coil in operative association with the sensor to pick up signals from the sensor. In some embodiments, the pick-up coil may be disposed in the support. In other embodiments, a fixing element may be employed for fixing the pick-up coil in operative proximity to the sensor. The pick-up coil is used for transmitting and receiving the radio frequency signals.

In certain embodiments, the sensor is configured to sense one or more conditions comprising a physical condition, a biological condition, or a chemical condition. The sensing device may provide a quantitative response for a desired parameter inside a container. For example, the sensing device may be employed to monitor magnitude of an environmental parameter of interest such as, but not limited to, conductivity measurement, pH level, temperature, blood relevant measurement, ionic measurement, non-ionic measurement, non-conductivity measurement, electromagnetic radiation level measurement, pressure, vapor concentration, biological material concentration, and other types of measurements that may be taken from a typical fluid (solution or gas). For example, the sensing device may be used in conjunction with disposable bioprocess components to monitor the parameters inside the components during or after the operation.

In one or more non-limiting examples, the container may be a disposable container, bioreactor, a stainless steel container, a plastic container, a polymeric material container, or a pre-sterilized polymeric material container. Further, the container may be of different size and shape, for example, micro fluidic channel, a Petri dish, a glove box, a hood, or a plastic bag. The container may or may not have a predetermined shape. In certain embodiments, the container is a disposable bioprocess component. Non-limiting examples of the bioprocess component include a disposable storage bag, a disposable container, a product transfer line, a filter, a connector, a valve, a pump, a bioreactor, a separation column, a mixer, or a centrifugation system. In one example, the disposable container or bag may be made of plastic. The disposable container may comprise ports for inserting the radio frequency based sensor and the pick-up coil. In one embodiment, the sensor and the pick-up coil may be inserted in the container using the same port. In other embodiment, the sensor and the pick-up coil may be inserted in the container using separate ports. In one embodiment, the support may be disposable.

In one embodiment, the radio frequency based sensor is a radio frequency identification (RFID) tag. A wide variety of commercially available tags may be applied for the radio frequency based sensors. These tags operate at different frequencies ranging from about 125 kHz to about 2.4 GHz. Suitable tags are available from different suppliers and distributors, such as Texas Instruments, TagSys, Digi Key, Fujitsu, Amtel, Hitachi and others. Suitable tags can operate in passive, semi-passive and active modes. The passive RFID tag does not need a power source (for example, a battery) for operation, while the semi-passive and active RFID tags rely on the use of onboard power for their operation. RFID tag has a digital ID and the frequency response of the antenna circuit of the RFID tag can be measured as the complex impedance with real and imaginary parts of the complex impedance. A sensing or a protecting film is applied onto the tag and the complex impedance is measured as a function of environment in proximity to the resulting sensor. Such sensor is fabricated as described in U.S. patent application Ser. No. 11/259,710 entitled "Chemical and biological sensors, systems and methods based on radio frequency identification" and U.S. patent application Ser. No. 11/259,711. Also, the RFID tag may be a transponder, which is an automatic device that receives, amplifies and retransmits a signal on a different frequency. Further, the RFID tag may be another type of transponder that transmits a predetermined message in response to a predefined received signal. This RFID tag may comprise, but is not limited to, one or more of the tags disclosed in U.S. patent application Ser. No. 11/259,710, entitled "Modified RF Tags and their Applications for Multiplexed Detection" filed on Oct. 26, 2005 and U.S. patent application Ser. No. 11/259,711, entitled "Multivariate Methods of Chemical and Biological Detection Using Radio-Frequency Identification Tags" filed on Oct. 26, 2005, which are hereby incorporated by reference. In one embodiment, the tag has an analog input into a memory chip associated with the tag. In one embodiment, a separate chemical, biological or physical sensor is connected to the analog input of the memory chip of RFID tag. In another embodiment, at least one chemical, biological or physical sensor is an integral part of the memory chip of the RFID tag where the sensor part of the tag was fabricated during the fabrication process of the memory chip itself. Memory chips of RFID tags are fabricated using known integrated circuit fabrication processes and organic electronic fabrication processes.

In one embodiment, the sensor may be disposable. In this embodiment, the sensor and/or the support may be detachable components of a given processing container. The sensor and/or the support may be disposed of or reused, depending on the application and environment in which they are used. The support may be made of, but is not limited to, plastic, polymer, metal, metal composite, or ceramics.

Conventional RFID tags are not resistant to gamma radiation, that is, upon exposure to gamma radiation, the stored information in these tags is either completely or partially lost, or undesirably modified to an extent that the information is no longer a true representation of the parameters being monitored. Therefore, such tags are difficult to use in settings that require gamma sterilization. In one embodiment, the radio frequency based sensor is gamma-radiation sterilizable to the extent required for pharmaceutical processing (25 to 50 kGy). That is, the sensor is capable of sensing the parameters even after being exposed to gamma radiation. In one example embodiment, the RFID tags themselves are capable of withstanding gamma radiation without catastrophic damage to their function as sensors.

In certain embodiments, the radio frequency based sensor is pre-calibrated before positioning the sensor in the support. In certain embodiments, the sensor is adapted to be removed from the support for additional recalibration or validation. The sensor may be re-calibrated during or after the operation in the container. In one embodiment, post recalibration, the sensor may be installed back in the support for the monitoring of the process. However, in another embodiment, where the sensing device is employed in a single use component, it may not be desired to re-install the sensor in the component once the sensor is removed. The term "single use component" refers to manufacturing or monitoring equipment, which may be disposed of after use or reconditioned for reuse. In one embodiment, the sensor may be employed to facilitate monitoring and control for in-line manufacturing.

In certain embodiments, a thin layer of a ferrite material is disposed between the sensor and/or the sensing device and any metal surrounding. As a result, the electromagnetic flux that is employed to interrogate the sensor is not attenuated by the metal surrounding, making it possible for these sensing devices to operate on metal surfaces. Further, the sensing device may include a metallic layer. The metallic layer may be disposed on the ferrite material. The metallic layer may diminish or at least partially terminate the electromagnetic field present around the sensing device as disclosed in the U.S. patent application Ser. No. 11/952,671, titled "Radio Frequency Sensor Circuitry Based Sensing Device" and filed on Dec. 7, 2007, incorporated herein by reference. In addition, in some embodiments, the metallic layer is configured to act as a sensing film. For example, the metallic layer may be such that upon interaction with an analyte the metallic layer changes one or two detectable properties. The sensing device may further include a sensing material or sensing film disposed on the radio frequency based sensor. As used herein, the term "sensing material and sensing film" refers to materials deposited onto the sensor and perform the function of predictably and reproducibly affecting the sensor response upon interaction with the environment. The typical sensor film may include a polymer, organic, inorganic, biological, composite, or nano-composite film that changes its electrical property based on the solution 101a that it is placed in. The sensor film may be, but is not limited to, a hydrogel such as poly(2-hydroxyethyl methacrylate), a sulfonated polymer such as Nafion, an adhesive polymer such as silicone adhesive, an inorganic film such as sol-gel film, a composite film such as carbon black-polyisobutylene film, a nanocomposite film such as carbon nanotube-Nafion film, gold nanoparticle-hydrogel film, electrospun polymer nanofibers, metal nanoparticle hydrogen film electrospun inorganic nanofibers, electrospun composite nanofibers, and any other sensor material.

In embodiments where the pick-up coil is fixed to the fixing element, the pick-up coil may be directly placed on a surface of the fixing element. Alternatively, the pick-up coil may be indirectly coupled to the fixing element. For example, the pick-up coil may be coupled to a holder attached to the fixing element, where the holder is capable of releasing the pick-up coil when required. In one embodiment, the fixing element may be in the form of an insert, where the insert is adapted to move in and out of the support. In another embodiment, the fixing element may be in the form of a cap that is adapted to be screwed on to the support. For example, the cap and the support may have matching mating threads that allow the cap to be screwed on to the support. In another embodiment, the fixing element may be in the form of a cap that has a bayonette fitting with the support. In one embodiment, the fixing element may be made of a plastic material and may be disposable in nature. In another embodiment, the pick-up coil may be non-disposable in nature. For example, the pick-up coil may be made of metal, or a metallic material that is preferably re-usable for efficiency and/or economic purposes.

Depending on the application, the sensor and/or the pick-up coil may be either permanently attached or removably attached to the container. For example, in applications requiring re-calibration of the sensor and/or the pick-up coil post operation, the sensor and/or the pick-up coil may be removably attached to the container. Whereas, in one time use applications, the sensor and/or the pick up coil may be permanently fixed to the container. In embodiments where the sensor is removably attached to the container, it is possible to remove the sensor from the support, or remove and subsequently re-fix the sensor in support, after use, calibration and/or validation. For example, post operation, the sensor may be removed from the support for calibration and then placed back in the support for the further operation in the container. In one embodiment, the sensor may be calibrated before disposing in the support. Additionally, the sensor may be removed from the support after the operation, re-calibrated and then re-installed in the support. Similarly, in some embodiments, the pick-up coil may be removed from the fixing element, and subsequently re-fixed to the fixing element, after use, calibration and/or validation. Accordingly, the support and/or the fixing element may be removably attached to the container.

The pick-up coil may be either fabricated or bought off the shelf. In embodiments where the pick-up coil is fabricated, the pick-up coil may be fabricated employing standard fabrication techniques such as lithography, masking, forming a metal wire in a loop form, or integrated circuit manufacturing processing. For example, the pick-up coil may be fabricated using photolithographic etching of copper-clad laminates, or coiling of copper wire on a form.

In certain embodiments, the sensor and the pick-up coil are co-located in the support in a preferred geometrical arrangement. In one embodiment, the sensor and the pick-up coil are fabricated on a single plastic substrate. In this embodiment, the mutual inductance between the sensor and the pick-up coil substantially remains the same and is physically difficult to change, thereby facilitating pre-calibration of the sensor prior to disposing this supported geometrical arrangement into a single use component. In another embodiment, the sensor and the pick-up coil are fabricated from a single piece of material such that the mutual inductance between the sensor and the pick-up coil is constant and the mutual inductance does not change upon determined operation conditions, thereby facilitating sensor pre-calibration and operation.

In these embodiments where the sensor and the pick-up coil are co-located, the pick-up coil employs a connector to provide periodic electrical connection to the pickup coil. For example, the connector may include standard electronic connectors, such as gold-plated pins. The pick-up coil may be attached to the support in different ways. For example, the pick-up coil may be attached to the support using an adhesive, or by molding the pick-up coil with the support, or by fastening the pick-up coil to the support using screws. Alternatively, holders may be provided in the support such that the pick-up coil can rest on the holders in the support.

In one embodiment, the co-located sensor and the pick-up coil may have a sensing film disposed on the sensor side that is opposite or faces the pick-up coil. For example, a sensing film may be employed for applications such as, but not limited to, pH sensing, glucose sensing, carbon dioxide sensing, oxygen sensing, pressure sensing, temperature sensing, and gamma radiation sensing.

As illustrated in FIG. 1, the sensor 1 includes an antenna 2 and a memory chip 5. The ends 3 and 4 on the antenna are electrically connected using a conductor medium (such as a conductor wire, a conductor strip, or a conductor cable) in such a way that the conductor medium does not electrically shorten the other regions of the antenna that this conductor medium crosses. The chip 5 is used for storing information. The chip 5 is activated by the radio frequency signal transmitted from the read/write unit. The antenna 2 of the sensor 1 receives and transmits signals. The signals transmitted by the antenna 2 are picked up by the pick-up coil or the reader 6, which then sends the signals out of the sensing device. The sensor 1 and the pick-up coil 6 are placed in operative proximity. In one example, the sensor 1 and the pick-up coil 6 may be coupled via inductive coupling or physical electrical connections. In embodiments where the pick-up coil is disposed in the fixing element, the electrical connections may be present in one or both of the support and the fixing element. Alternatively, in another embodiment, the sensor 1 and the pick-up coil 6 may not be coupled via electrical contacts. In this embodiment, the sensor 1 and the pick-up coil 6 may be adapted to communicate wirelessly.

Figure 4:
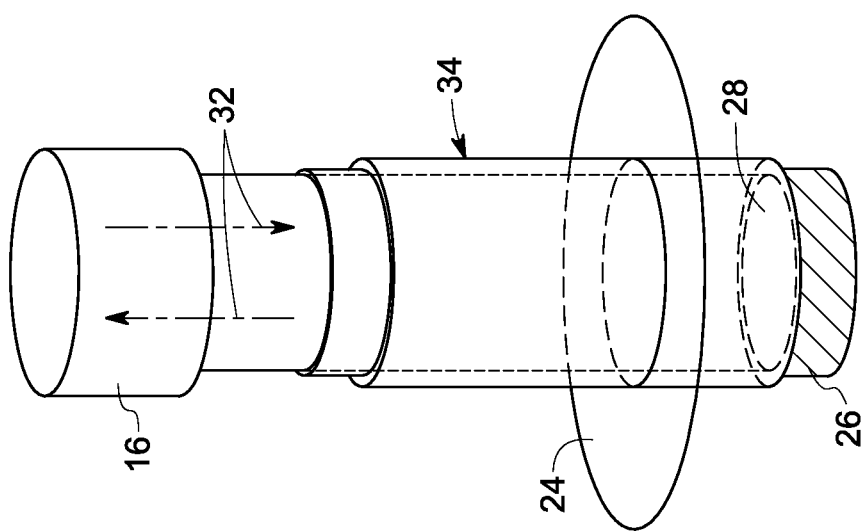
FIG. 4 is a perspective view of an assembly of the sensing device employing the fixing element and the support of FIGS. 2 and 3, respectively.
Figure 3:
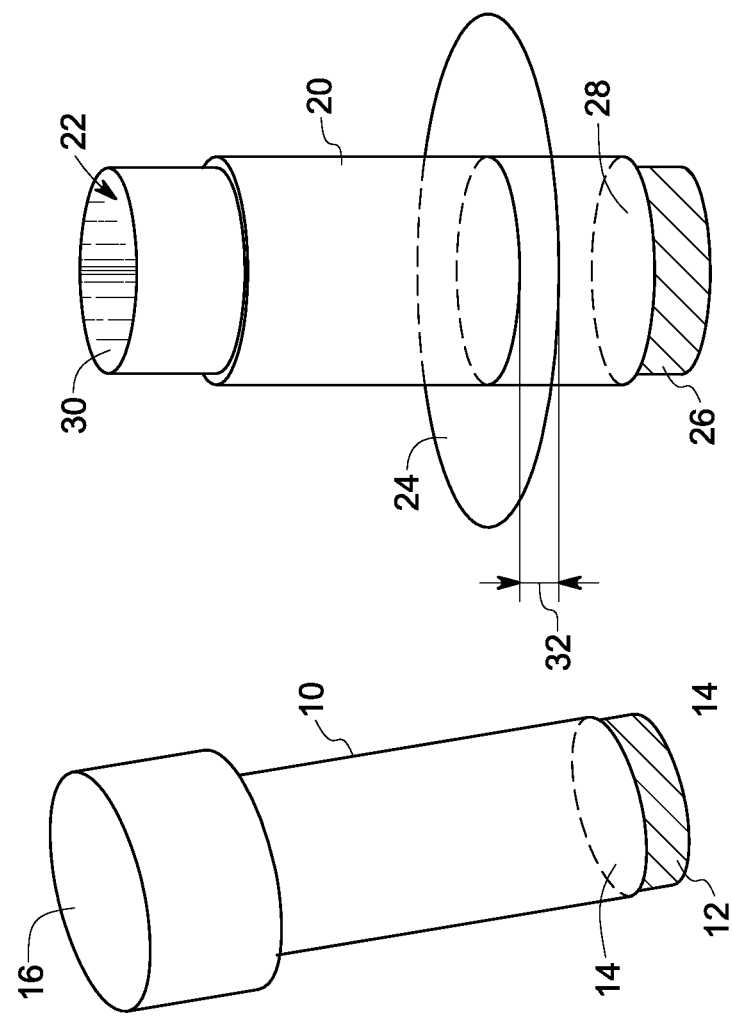
FIG. 3 is a perspective view of an example of a support having a radio frequency based sensor.
Figure 2:
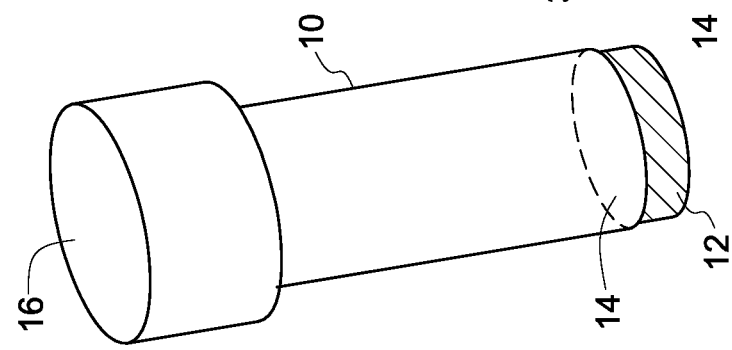
FIG. 2 is a perspective view of an example of a fixing element for fixing a pick-up coil.

As illustrated in FIG. 2, the insert 10 may include a pick-up coil 12 disposed at a first end 14 of the insert 10. In one embodiment, the pick-up coil 12 may be either directly or indirectly disposed on a surface of the insert first end 14. In one embodiment, the pick-up coil 12 may be non-disposable. The second end 16 of the insert 10 may be relatively broader than the first end 14. The increased dimensions of the second end 16 may also act as a mechanical stopper to restrict the entry of the insert 10 in a support 20. For example, as illustrated in embodiments in FIGS. 3 and 4, a support 20 having a cavity 22 to receive the insert 10 is illustrated. Although the illustrated embodiments only refer to circular cross-sections of the insert 10 and the support 20, other geometrical shapes of the cross sections of insert 10 and the support 20 may also be used. The support 20 further comprises a flange 24, which works as a mechanical stopper to restrict the entry of the support to a determined length in the container. A radio frequency based sensor 26 is coupled to a first end 28 of the support 20. The distance between the flange 24 and the first end 28 of the support 20 may vary depending on the size and type of container where the sensing device 34 is employed. For example, for smaller containers the sensor 26 may be closer to the flange 24, and vice versa. As illustrated, the second end 30 of the support 20 is configured to receive the fixing element, for example, the insert 10. The two way arrows 32 indicates that the insert 10 may be placed in the support 20 when monitoring the parameters in the container (not shown) and later on, once the measurements are over, the insert 10 may be removed from the support 20. In other words, the insert 10 may be removably disposed in the support 20.

Figure 5:
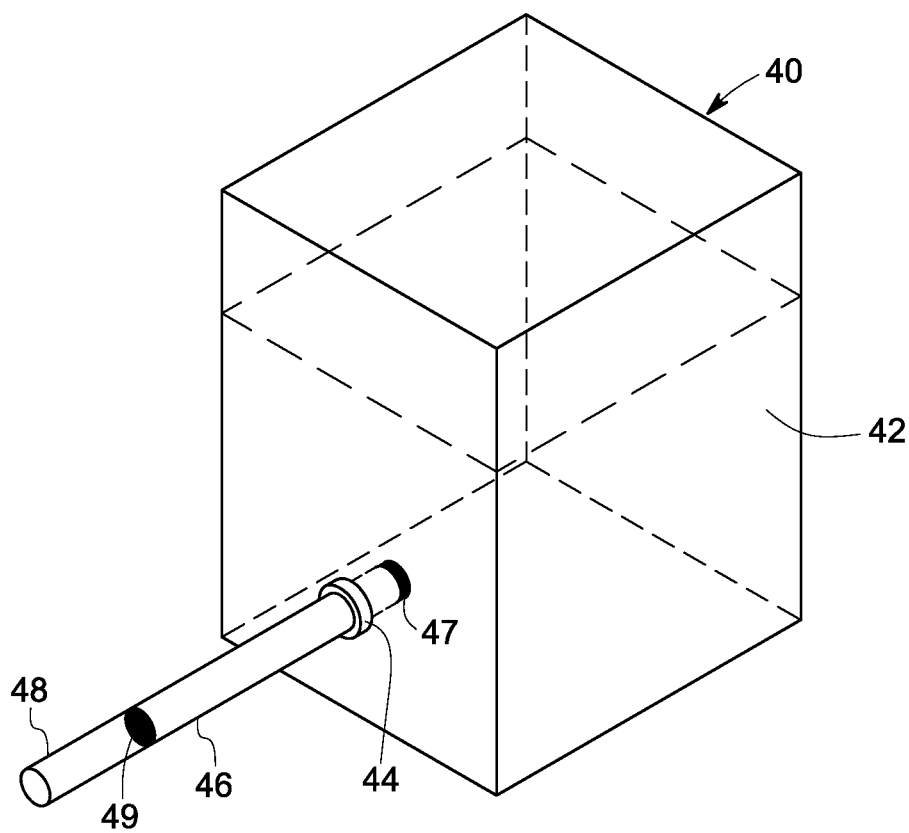
FIG. 5 is a perspective view of a container employing the sensing device of FIG. 4.

As illustrated in FIG. 5, the container 40 has a fixed shape, however, the container may also have a flexible shape. The container 40 may be made of a plastic material and may be disposable in nature. The container 40 is partly filled with a solution 42, the solution 42 may be a liquid, fluid or gas, a solid, a paste or a combination of liquid and solid. For example, the solution 42 may be water, a biological buffer, blood, or gas. In the illustrated embodiment, the container 40 has a single port 44 for inserting the support 46 and the insert 48 housing the sensor 47 and the pick-up coil 49, respectively.

Figure 6:
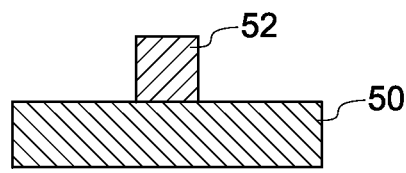
FIG. 6 is a side view of an example of a pick-up coil adapted to be disposed in a support.
Figure 7:
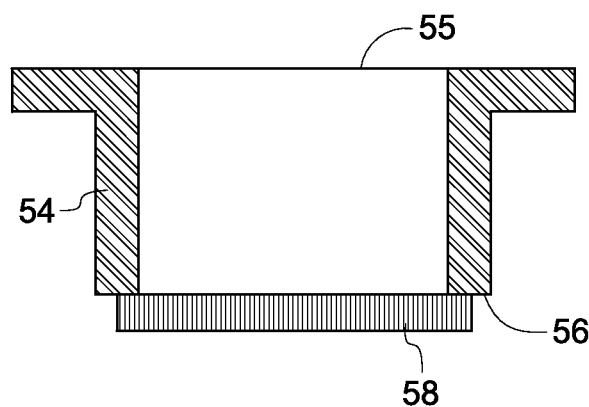
FIG. 7 is a side view of an example of a support having a radio frequency based sensor.
Figure 8:
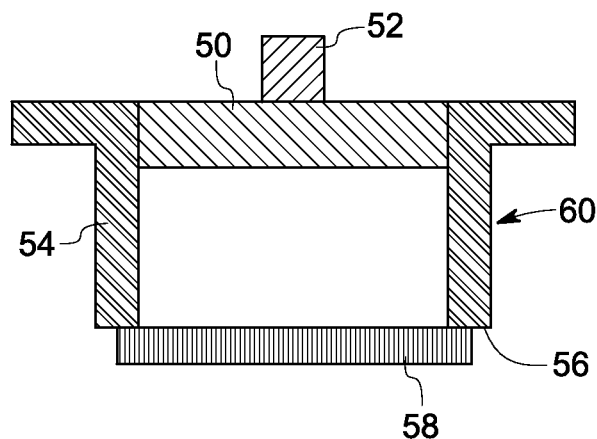
FIG. 8 is a side view of an assembly of the sensing device employing the pick-up coil and the support of FIGS. 6 and 7, respectively.

FIG. 6 illustrates a side view of a pick-up coil 50 having an electrical connector 52. The connector 52 is employed to connect the pick-up coil to a network analyzer and to a reader/writer. FIG. 7 illustrates a side view of a support 54 having a first end 55 and the second end 56. The second end 56 is adapted to receive a radio frequency based sensor 58, and the first end 55 is configured to receive the pick-up coil 50 having the connector 52. As illustrated in FIG. 8, the pickup coil 50 is disposed in the support 54 to form the sensing device 60.

Figure 9:
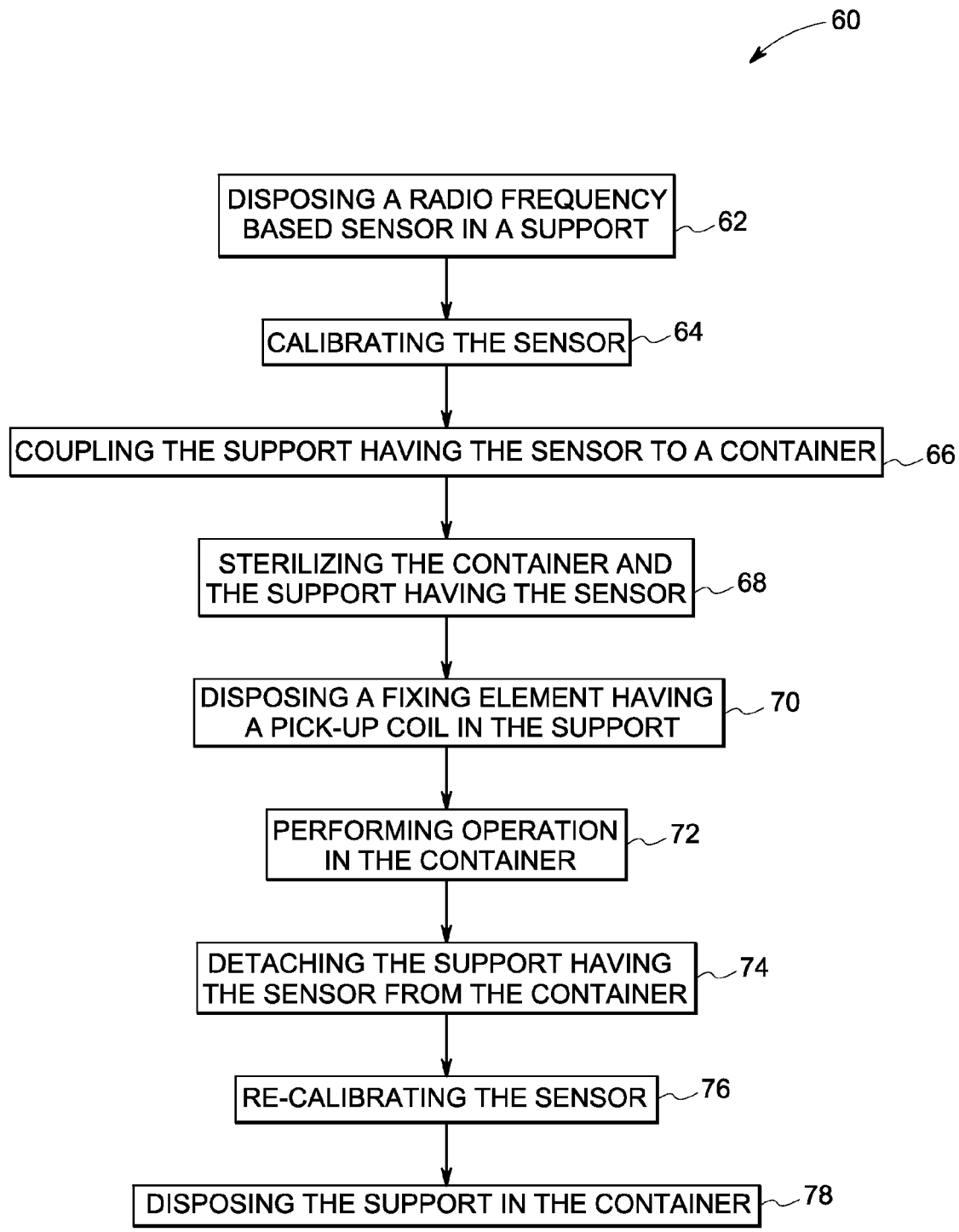
FIGS. 9 and 10 are flow charts illustrating the steps involved in employing a sensing device in a container.

FIG. 9 illustrates a flow chart 60 for the operation of the container having the sensing device, such as the sensing device 34 (see FIG. 4), where a radio frequency based sensor is disposed in a support and a pick-up coil is disposed in a fixing element to form a sensing device. At block 62, the sensor is disposed in the support. At block 64, the sensor that is disposed in the support is calibrated. Next, the support having the pre-calibrated sensor is coupled to the container (block 66). For example, the support may be fixed to an opening in the container that is designed to receive the support. The support is removably fixed to the container. At block 68, the container having the sensor may be sterilized. For example, the container along with the sensor is exposed to gamma radiation for sterilizing. Next, the fixing element having the pick-up coil is disposed in the support such that the sensor and the pick-up coil are in operative proximity of each other (block 70). At block 72, the operation is performed in the container. For example, in case of a bioprocess component, the processing is carried out. Blocks 74-78 illustrate optional steps that may be performed if re-calibration or validation of the sensing device is required after performing the operation in the container. At step 74, the support having the sensor is removed from the container. Next, at block 76, the sensor is re-calibrated, and subsequently, the support is re-fitted in the container (block 78) for further use.

Figure 10:
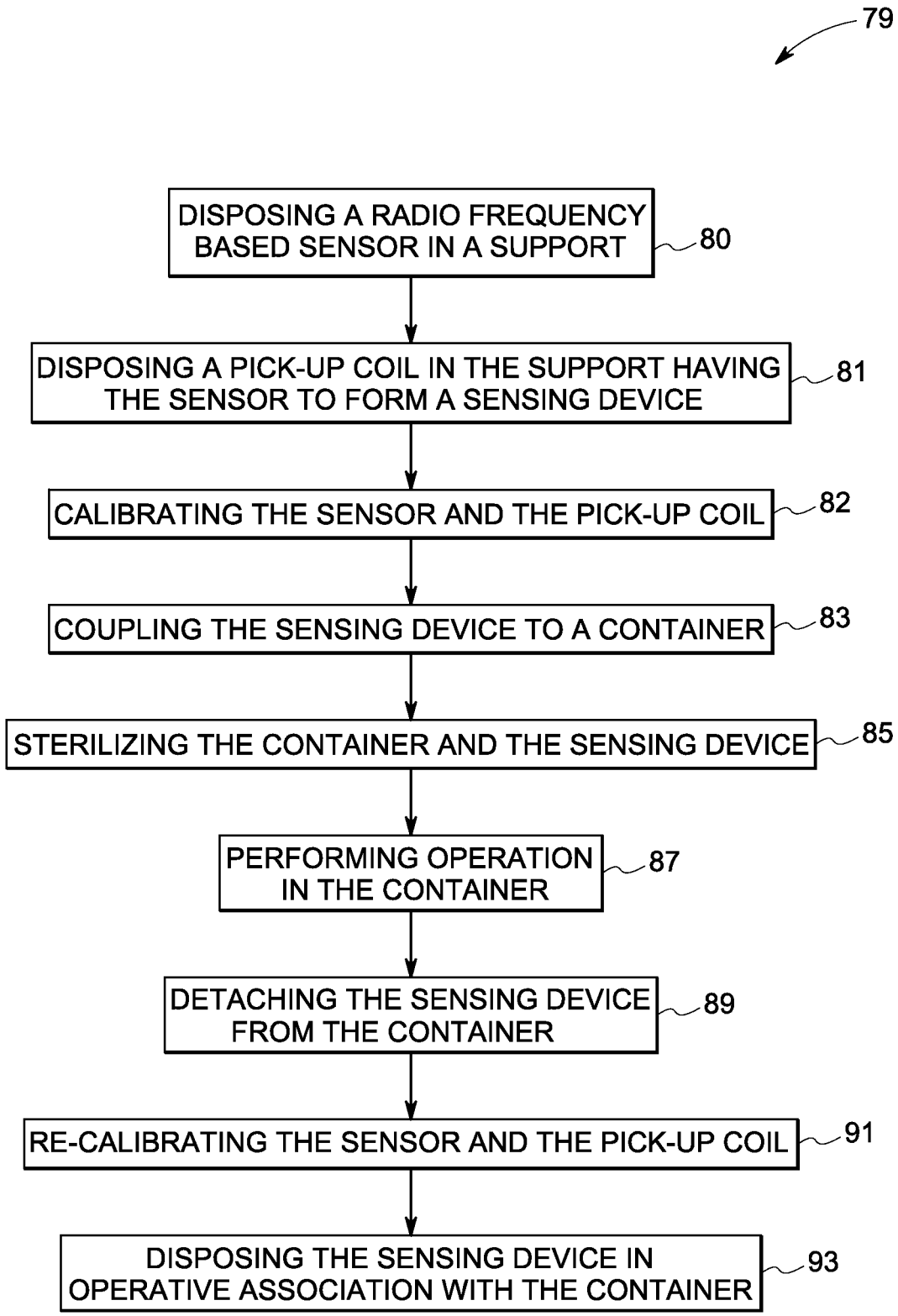

FIG. 10 illustrates a flow chart 79 for the operation of the container having the sensing device, such as the sensing device 60 (see FIG. 8), where both the radio frequency based sensor and the pick-up coil are disposed in a support to form a sensing device. At block 80, the sensor is disposed in the support. At block 81, the pick-up coil is disposed in the support having the sensor to form a sensing device. At block 82, the sensing device including the sensor and the pick-up coil is calibrated. Next, the sensing device is coupled to the container (block 83). In one embodiment, the sensing device is removably fixed to the container. At block 85, the container having the sensing device is sterilized by employing gamma radiation, for example. At block 87, the operation is performed in the container. At block 89, the sensing device, that is the support having the sensor and the pick-up coil, is removed from the container. Next, at block 91, the sensor and the pick-up coil are re-calibrated, and subsequently, the support is re-fitted in the container (block 93) for further use.

EXAMPLES

Measurements of the complex impedance of RFID sensors were performed using a network analyzer (Agilent Technologies, Inc. Santa Clara, Calif.) under a computer control using LabVIEW. The analyzer was used to scan the frequencies over the range of interest (typically centered at 13 MHz with a scan range of ~10 MHz) and to collect the complex impedance response from the RFID sensor. The collected complex impedance data was analyzed using Excel (MicroSoft Inc. Seattle, Wash.) or KaleidaGraph (Synergy Software, Reading, Pa.) and PLS_Toolbox (Eigenvector Research, Inc., Manson, Wash.) operated with Matlab (The Mathworks Inc., Natick, Mass.). Data presented in Examples below illustrates a collected sensor response Zp which is the magnitude of the real part of the complex impedance.

Digital ID readings from the memory micro-chips of RFID sensors were performed with several RFID readers that included a handheld SkyeTek reader, and a SkyeTek computer-controlled (using LabVIEW) reader, respectively (Model M-1, SkyeTek, Westminster, Colo.), and a computer-controlled multi-standard RFID Reader/Writer evaluation module (Model TRF7960 Evaluation Module, Texas Instruments).

Example 1

Affect of Change in Separation Between the Sensor and the Pickup Coil

Figure 11:
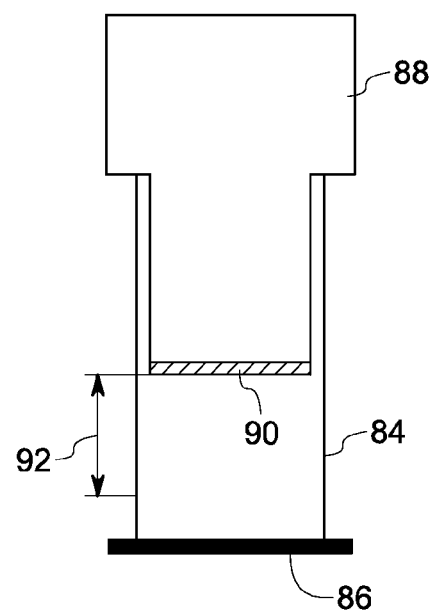
FIG. 11 is a cross-sectional view of an assembly of a sensing device.
Figure 12:
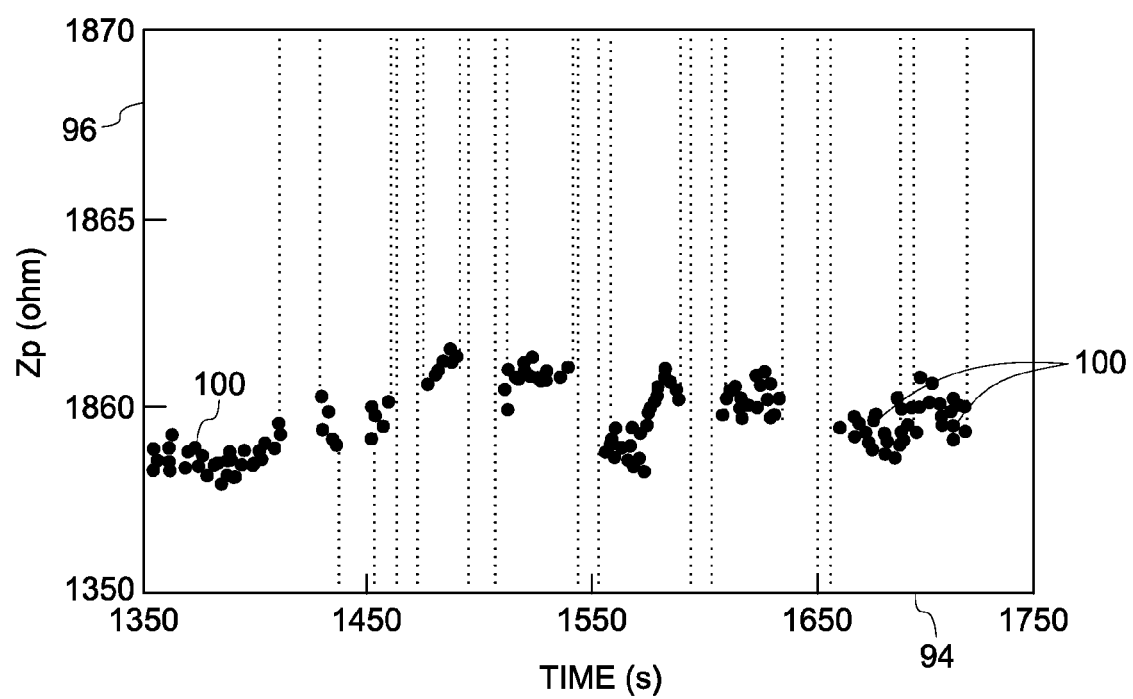
FIG. 12 is a graphical representation illustrating variations in sensor parameter with respect to the change in separation between the sensor and the pick-up coil.

An example set up for evaluating the concept of a pick-up coil disposed in a re-usable fixing element is illustrated in FIG. 11. The support 84 comprises a radio frequency based sensor 86 disposed at one end. A fixing element 88 housing or otherwise supporting the pick-up coil 90 is adapted to slide in and out of the support 86. Alternatively, the pick-up coil is configured to clamp to the support, to screw into the support, has a bayonette fitting with the support. The arrow 92 represents the distance that can be traveled by the fixing element 88 inside the support 84. The separation between the sensor 86 and the pick-up coil 90, in this example, may be periodically changed. The graph in FIG. 12 represents the timeline on the abscissa 94 and the Zp parameter of the sensor response on the ordinate 96. The time periods at which the separation of the sensor 86 and the pick-up coil 90 were changed are represented by dotted lines 98. The dots 100 represent the response of the sensor with the change in separation of the sensor 86 and the pick-up coil 90 with time. Controlled re-positioning of the pick-up coil 90 resulted in negligible 0.1% relative signal change of the sensor 86.

Example 2

Operation of Pressure Sensor

Figure 13:
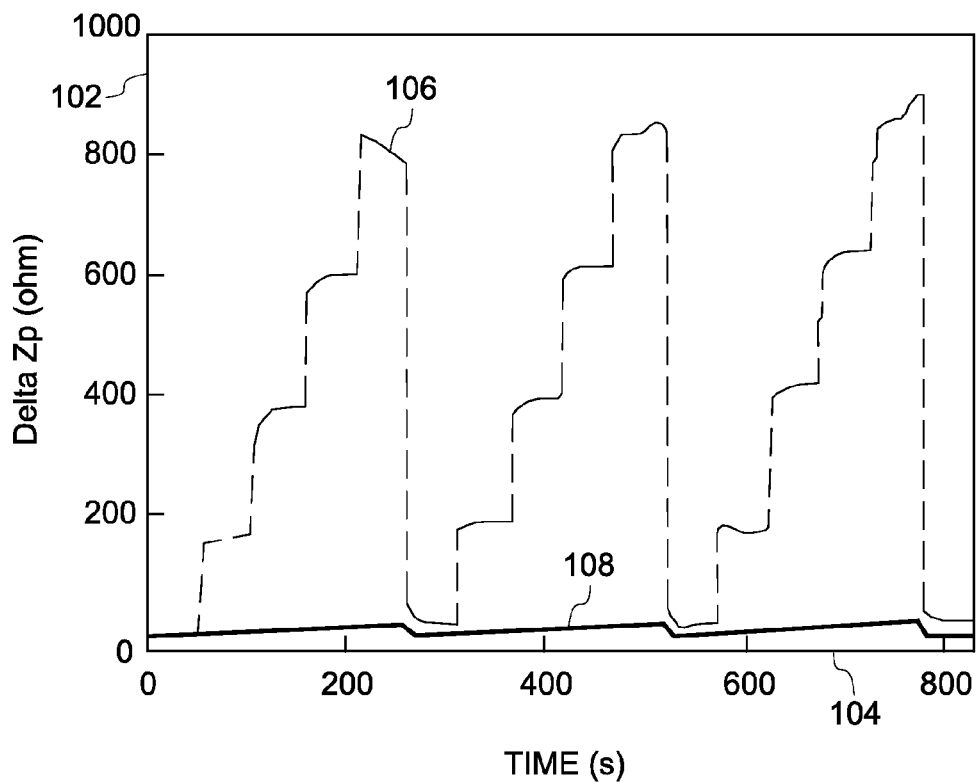
FIG. 13 is a graphical representation illustrating changes in Zp parameter of the sensor when employing a flexible membrane and a non-flexible membrane.

Sensors for measurements of liquid pressure and flow are incorporated into inserts that are imbedded into components of transfer lines. As illustrated in FIG. 13, for pressure measurements with RFID sensors, a controlled change of coupling between sensor, pick-up coil and an auxiliary membrane was employed.

Pressure measurements were taken by monitoring the change in the coupling of the RFID sensor and the pick-up coil when the sensor was positioned on a flexible nitrile membrane. Positioning of the RFID sensor onto a non-flexible sheet resulted in nondetectable signal change, while response of the sensor on the nitrile substrate was 40 ohm/psi.

Figure 14:
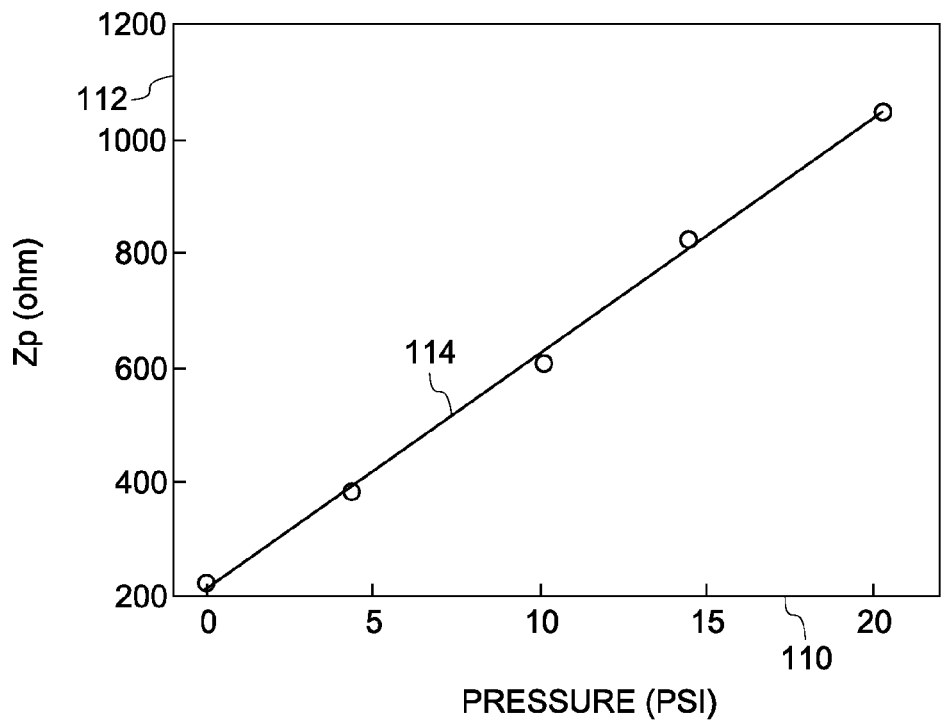
FIG. 14 is a graphical representation illustrating response of a RFID pressure sensor to pressure changes from 0 to 20 psi.

For this short-term experiment, taking into the account only the noise in the sensor response, the calculated detection limit was 0.12 psi Results of these experiments are presented in FIGS. 13 and 14.

FIG. 13 is a graphical representation of the pressure response (abscissa 102) with respect to time (ordinate 104). In the illustrated embodiment, the pressure response for the RFID sensor on the nitrile substrate (dotted line 106) and the polycarbonate substrate (solid line 108) with a fixed pick-up coil is shown. Substrate flexing produces highly reproducible sensor/pick up coil distance changes that alter the sensor response. More rigid substrates (e.g. polycarbonate) produce smaller changes for a given pressure. FIG. 14 is a graphical representation of the response of parameter Zp (ordinate 112) of the sensor to the pressure changes (abscissa 110) from 0 to 20 psi as shown by graph 114.

While only certain features of the invention have been illustrated and described herein, many modifications and changes will occur to those skilled in the art. It is, therefore, to be understood that the appended claims are intended to cover all such modifications and changes as fall within the scope of the invention.

The invention claimed is:

1. A sensing device for sensing one or more conditions inside a container, comprising:
a radio frequency based sensor comprising a sensing film;
a support for positioning the sensor in operative proximity to the inside of the container, wherein the support is configured to receive the sensor on an end;
an insert; and
a pick-up coil coupled to the insert, wherein the pick-up coil is in operative association with the sensor,
wherein the insert is configured to move in and out of another end of the support such that a distance between the pick-up coil and sensor is adjustable.

2. The sensing device of claim 1, wherein the insert is removably coupled to the support.

3. The sensing device of claim 1, wherein the sensor is removably attached to the container.

4. The sensing device of claim 1, wherein the radio frequency based sensor is pre-calibrated.

5. The sensing device of claim 1, wherein the container is a disposable bioprocess component.

6. The sensing device of claim 5, wherein the bioprocess component comprises one or more of a storage bag, a transfer line, a filter, a connector, a valve, a pump, a bioreactor, or a separation column.

7. The sensing device of claim 1, wherein the radio frequency based sensor is gamma-radiation sterilizable.

8. The sensing device of claim 1, wherein the pick-up coil is pre-calibrated.

9. The sensing device of claim 1, wherein the radio frequency based sensor is disposable.

10. The sensing device of claim 1, wherein both the sensor and the pick-up coil are disposed in the support.

11. The sensing device of claim 10, wherein the support is disposable.

12. The sensing device of claim 1, wherein the sensing film is disposed on the sensor side opposite to the pick-up coil.

13. The sensing device of claim 1, wherein the sensor is configured to sense one or more conditions comprising a physical condition, a chemical condition, and a biological condition.

14. The sensing device of claim 1, further comprising a ferrite material disposed on the radio frequency based sensor.

15. The sensing device of claim 14, further comprising a metallic layer disposed on the ferrite material.

16. The sensing device of claim 1, wherein the radio frequency based sensor comprises a radio frequency identification (RFID) tag.

17. The sensing device of claim 1, wherein the radio frequency based sensor is a radio frequency identification tag with an analog input into a memory chip.

18. A sensing device for sensing one or more conditions inside a disposable container, comprising:
a radio frequency based sensor, wherein the sensor is pre-calibrated;
a pick-up coil in operative association with the sensor, and
a support for positioning the sensor and the pick-up coil in operative proximity to one another.

19. A sensing device for sensing one or more conditions inside a disposable container, comprising,
a radio frequency based sensor comprising a sensing film;
a support for positioning the sensor in operative proximity to the inside of the container, wherein the support is configured to receive the sensor on an end;
a pick-up coil in operative association with the sensor; and
an insert configured to move in and out of another end of the support such that a distance between the pick-up coil and the sensor is adjustable, and wherein the pick-up coil is directly or indirectly fixed to the insert.

20. The sensing device of claim 19, wherein the pick-up coil is non-disposable.

21. The sensing device of claim 19, wherein the pick-up coil is attached to the container without electrical contact with the sensor.

22. The sensing device of claim 19, wherein the pick-up coil is in physical contact with the support.

23. A system comprising:
a sensing device for sensing one or more conditions inside a container, comprising:
a radio frequency based sensor, wherein the sensor is pre-calibrated;
a support for positioning the sensor in operative proximity to the inside of the container; and
a pick-up coil in operative association with the sensor.

24. The system of claim 23, wherein the sensing device is operatively coupled to a disposable bioprocess component.

* * * * *